3,154,058
INTERNAL COMBUSTION ENGINE OPERATING ON STRATIFIED COMBUSTION PRINCIPLE WITH EXPLOSIVE FUEL INJECTION
Glenn B. Warren, 1361 Myron St., Schenectady, N.Y.
Filed Jan. 2, 1962, Ser. No. 163,406
4 Claims. (Cl. 123—32)

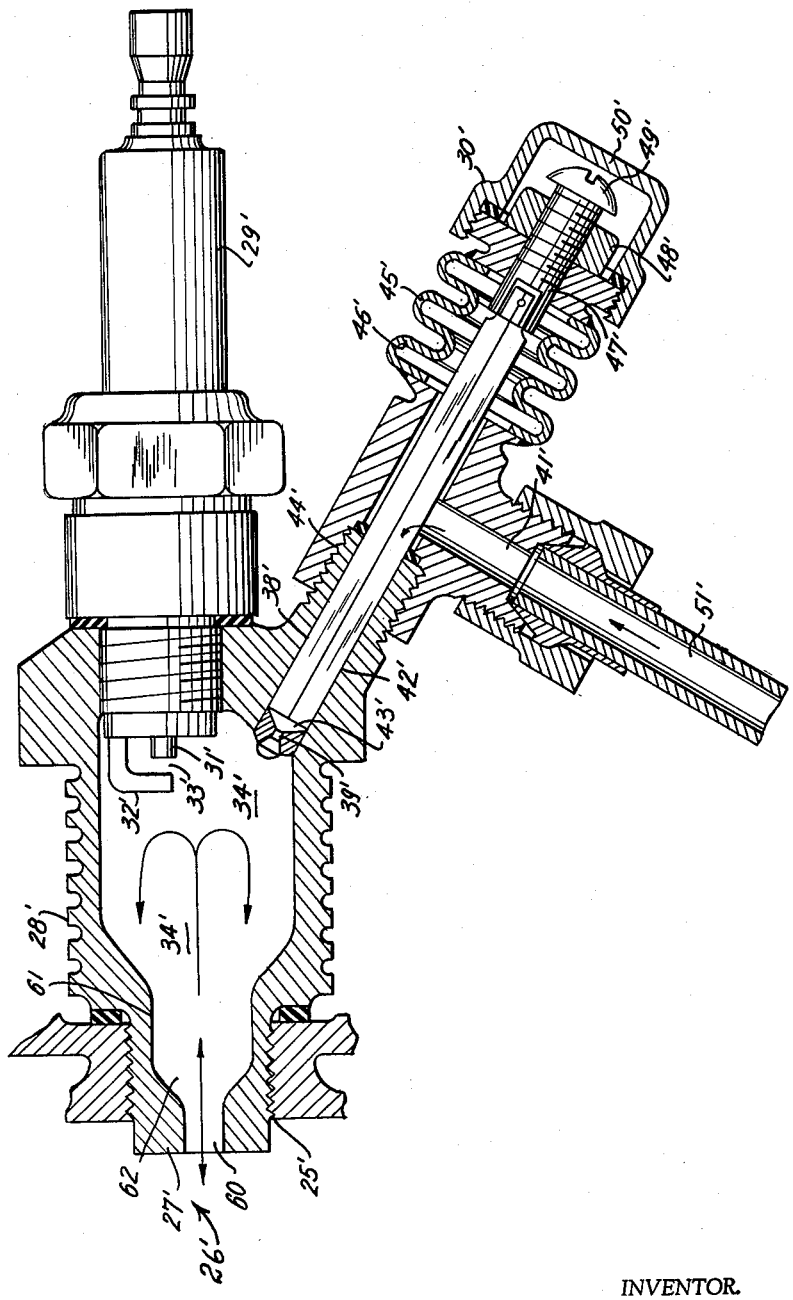

This invention relates generally to internal combustion engines and more particularly to an internal combustion engine operating on the stratified combustion principle.

The thermodynamic cycle upon which an internal combustion engine operates is determined by the design of the engine and the cycle of operation and the engine is selected on the basis of the results desired. The presently used internal combustion engines for the most part fall into three broad categories.

The first category includes engines in which the fuel and combustion air is fed and mixed through a carburetor into and through an inlet manifold and thence into an explosion chamber formed by a piston and a cylinder, and the air fuel mixture to the inlet manifold is throttled for control at the lighter loads on the engine. The compressed mixture within the chamber is ignited by a spark in timed relation wtih the piston movement. In the second general category fuel is injected into a cylinder at relatively low pressure during the compression or suction stroke or may be injected into the intake manifold in measured amounts. The mixture is spark ignited and load is controlled by combined fuel control and inlet air throttling in order to obtain a proper explosive mixture at the end of the compression stroke at all loads and altitudes. The third general category is direct high pressure fuel injection into the combustion chamber of the engine at the proper point near the top of the piston travel on the compression stroke and ignition is accomplished by the high temperature reached by the air at the end of the compression stroke. The load is controlled by varying the quantity of fuel fed or injected in general without throttling the air inlet.

The first of these categories is embodied in most present automotive gasoline engines which are operated on the so-called Otto cycle. This type of engine can be designed to give high power output without sacrificing engine weight and can be made to respond quickly over a wide speed range. To preclude preignition due to the heat of compression, the compression ratio must generally be less than ten to one, and so-called "high octant fuel" must be used to prevent "knocking" or "detonation." This engine is inefficient and costly to operate due primarily to the inefficiency of the cycle itself, pumping losses due to throttling at the lighter loads at which the automobile usually operates, cold weather "choking," costly anti-knock additives required, and generally incomplete burning of the hydrocarbon fuel because of the over rich fuel-air mixture inherently required for good operation of such engines. The inefficient operation is coupled with the emission of a high degree of unburned hydrocarbons through the exhaust which creates a health hazard in many locales and which give rise to much of the so-called "smog" problems in certain congested areas.

The second category set forth above is used in many aircraft engines, on some models of the present Mercedes Benz automobile, and other spark ignited engines with so called "fuel injection." This category has all of the disadvantages of the first classification plus the fact that there is greater complication in hardware, parts and control. Such operation, however, does avoid an air pressure drop through the carburetor and so can be made to give ten percent or so greater maximum output for a given size engine, and has some advantages in securing more uniformity in the mixture fed to multi-cylinder engines.

The third category which is commonly known as the diesel high pressure fuel injection, compression ignition engine, has been widely and successfully used in trucks, buses and many other applications. For such an engine to ignite its fuel the compression ratio must be about 20 to 1 or more. As a result, this engine is very economical of fuel but is low in power for its weight, limited in top speed, noisy, due to the high pressure injection system, limited in low speed torque and flexibility, rough in operation and in smaller sizes has high mechanical friction losses resulting from the high compression pressures. Engines falling into this category require fuel having a high "cetane" rating, that is, a fuel which is easily ignitible.

It has long been recognized that if a lower compression engine—10 to 1 or so—with an unthrottled air inlet had a fuel injector similar to a diesel and in addition a spark ignition such an engine might have great advantages and combine many of the advantages of all three classifications of engines above without the disadvantages of any. At full load such an engine would work satisfactorily, but at lighter loads the fuel air mixture if uniform would be so lean as to preclude ignition.

Over the past several years engines have been developed to operate as above but on what has been called the "stratified charge" or "stratified combustion" principle. In this at the lighter loads the fuel is mixed with only a part of the air in the combustion chamber and strategically placed with respect to the location and timing of the ignition device and so good combustion is insured. The invention disclosed herein is intended to apply to the type of internal combustion engine which operates on the "stratified combustion" principle and will be described in relation to that category but is believed to have unique construction and advantages compared to any such known engines today. It is recognized, however, that certain of the teachings herein can be utilized in engines operative on other cycles and the scope of the invention is not restricted to engines operating on the "stratified combustion" principle. I have also included herein a specific design utilizing certain of the teachings of the invention intended for use in an engine operating on a diesel cycle, or compression ignition cycle.

In utilizing the "stratified combustion" principle the present engines draw in a full unthrottled charge of air as in a diesel. The fuel is then injected at relatively high pressure in an atomized jet near the end of the compression stroke and ignited by a properly placed spark almost simultaneously. For full load operation the injection of the fuel must be such that it disburses throughout the combustion chamber quickly and uniformly and mixes with the air to give a complete utilization of the air and hence maximum possible output. It has been found that as stated above engines operating on the spark ignition injection principle work satisfactorily at full load and perform unsatisfactorily at lighter loads without stratification. This is because in an engine designed for good full load operation the mixture is too lean at partial loads to burn properly if uniformly mixed, resulting in engine misfire or combustion so slow that it is not completed early enough to produce an effective expansion or power stroke. The "stratification" of the mixture needed at the lighter loads may be accomplished in several ways.

For example, it has been known for some time that the inducement of a high speed swirl in the inlet air and around the axis of the cylinder to draw out and stratify or segregate the injected fuel at partial loads in a smaller portion of the air in the chamber will give an ignitible mixture at partial loads if ignited at the proper place and time. Strategical placing of the spark plug and its timing to ignite this stratified and segregated mixture is required. Excellent light load economy can be obtained by such a design due to the complete burning of the fuel resulting from the excess of air present outside the stratified fuel zone and the inherently high cycle efficiency of lean mixture operation. Additionally, due to the inherent anti-knock qualities of a stratified mixture with non-burnable gases near the cylinder walls, this type of engine operation has demonstrated an ability to use a wide range of fuels without regard to the anti-knock or "octane" rating, and the spark ignition makes it insensitive to the "cetane" rating or easy ignition character of the fuel.

The primary disadvantages of this type of engine operation are relatively high pumping losses due to the swirl that needs to be imparted, lower volumetric efficiency due to imparting the swirl and hence horsepower limitations at high speed. Additionally, with such a design it has been found that major structural modifications must be accomplished in order to alter the presently existing designs of automotive engines so that this operation can be accomplished and the two openings required, one for the injector, the other for the spark plug in addition to the inlet and outlet valves reduce the available area for the valves and hence limit the maximum output which can be obtained from a given cylinder size.

The invention disclosed herein provides a single simple device for injecting and igniting the fuel and so as to cause the engine to operate inherently on the "stratified combustion" principle.

Motor cars equipped with this type of engine would not contribute appreciably to the smog forming ingredients in the densely populated urban areas because of the substantially complete burning, due to the excess air present during the greater period of time at which the engine does not operate at full load.

The invention herein disclosed has as its principal object the provision of a power plant for a motor vehicle operating on gasoline or other suitable fuel which will have substantially the same weight to maximum power ratio as the engines presently utilized for this purpose and which will have greater economy at the lighter cruising loads and speeds. At the same time, such an engine will burn the fuel completely so as to give an exhaust substantially free of unburned hydrocarbons.

A further object of this invention is to provide an engine operating on the stratified combustion principle which will operate without consideration of octane and cetane numbers and which displays good cold-starting and warm-up characteristics and so will utilize a variety of fuels with equal satisfaction.

Another object of this invention is the provision of means for modifying the present engines used in motor vehicles with a minimum of expense so that such engines can satisfactorily operate on the "stratified combustion" principle with substantially unthrottled air intake at lighter loads and retain the foregoing advantages.

In order to accomplish the above stated objects as well as additional objects which will become apparent as the description herein is considered, I have combined a small combustion chamber frequently called a pre-combustion chamber in a motor vehicle engine for initial burning of part of the fuel with a fuel-injected, spark-ignited cycle together with means for aspirating a complete cylinder charge of an over rich mixture for short periods of operation at maximum loads.

An internal combustion engine operating on the stratified combustion principle, constructed and operated in accordance with the teachings of this invention, is described herein with references to the drawings, in which:

The single figure is a longitudinal enlarged cross sectional view of an embodiment of the device.

In the figure a preferred embodiment of the device is shown. A threaded bore 25' is provided in the engine communicating with the combustion chamber 26'. Bore 25' is formed to receive the cylindrical externally threaded neck portion 27' of the adaptor housing 28'. Adaptor housing 28' is designed to fit within the single hole which would receive a spark plug in spark ignited engines presently used although a slight enlargement of this hole may be required in some cases.

The adaptor housing 28' is generally cylindrical in appearance having various cross-sectional diameters and is provided at one end with spark plug 29' and injection member 30'. The spark plug 29' is the spark plug commonly used today in internal combustion engines and is provided with electrodes 31' and 32' forming an air gap 33' within auxiliary preliminary chamber 34' formed within the adaptor housing. Other ignition means such as a "glow plug" may be used in place of a spark plug.

Auxiliary preliminary chamber 34' is also generally cylindrical in configuration although it, too, has varying cross-sectional diameters and the precise configuration of the chamber is important only in its volumetric relation to the remaining portions of the assembly and the openings communicating therewith and in provisions for insuring turbulence therein.

Injector 30' is of the type shown and described in my co-pending application, Serial No. 146,736, filed Oct. 23, 1961, consisting of an internal cylindrical bore 38' which can be formed in the body of an adaptor 28' if desired. Bore 38' communicates with auxiliary preliminary chamber 34' through orifice 39'. Bore 41' is provided communicating with bore 38'.

Bore 41' is provided for receiving fuel under timed pressure pulses to be injected into the auxiliary preliminary chamber in a timed relation to the movement of the engine piston. Stem 42' is disposed longtiudinally within bore 38' with its extreme end 43' in close contact with the surface surrounding orifice 39' and providing therewith a valving seat arrangement. When portion 43' is firmly adjacent the area surrounding orifice 39, communication of orifice 39' with bore 38' will be prevented.

Bellows 45' is formed of a resilient material and provided with a cylindrical bore 47' through which the end of stem 42' projects so that it can be rigidly attached thereto by means of nut 48' and bolt 49'. Cap 50' is provided to enclose the nut and bolt.

With the end of stem 42' firmly anchored in position at the end of bellows 45', the injector will operate as described in my above referred to co-pending application. Generally the operation will be that upon injection of fuel through passage 51' and bore 41' under pressure and into chamber 46' the pressure build-up within chamber 46' will cause the end of the bellows 45' carrying the stem to move outwardly and away from the adaptor moving the stem away from orifice 39' and allowing the fuel to be injected through orifice 39' into auxiliary preliminary chamber 34'. When the pressure within chamber 46' goes below a predetermined value the stem end 43 will engage the area surrounding orifice 39' and further injection will be prevented. Any other of the many standard but more complicated forms of injection nozzles might be used.

Fuel is injected on a timed basis through orifice 39' into the auxiliary preliminary chamber 34' just before the piston has reached the top dead center position on the compression stroke. Air from the engine cylinder combustion space flows into auxiliary preliminary, chamber 34'. Turbulence is created in auxiliary preliminary chamber 34'. The fuel will be atomized and ignited from igniter 29' in a stratified principle in the turbulent air in the main combustion chamber. The build-up on an over-rich fuel and hence un-ignitable mixture prior to combustion in the pre-combustion chamber is prevented.

The device shown in the figure, is characterized by the fact that orifice 60 leading from auxiliary 34' to the main combustion chamber is the only outlet from auxiliary preliminary chamber 34' to the main combustion chamber, and due to the angular mounting of the injector passage 41'', it is possible to by-pass most of the fuel through the auxiliary preliminary chamber without burning it, but instead, atomizing it by spraying it on a small area 62 of the hot wall chamber near the outlet orifice 60 where the gas velocity toward the orifice 60 will be high following explosion. It is critical that the nozzle be mounted at an angle and directed at a point indicated by the numeral 61 in the figure on the interior wall of the auxiliary preliminary chamber 34″ near opening 60. In such a device operating on a pre-combustion principle with ignition prior to and during direct injection, the auxiliary preliminary chamber volume should be less than one-third the engine clearance space so as to have a sufficiently rich mixture in the pre-combustion space at the lightest load and lowest injection rate so as to insure ignition. The injection is pointed to the wall near 61 and it is proposed to inject an imperfectly atomized stream into the chamber at that point on the wall. The turbulent air motion in the auxiliary preliminary chamber, due to the entrance of the air from the engine cylinder through opening 60 will very quickly, together with the temperature of the air and the temperature of the wall of the auxiliary preliminary chamber, evaporate enough of the fuel injected to provide an explosive mixture and the resulting explosive pressure will drive the remaining fuel out through the opening into the main cylinder clearance space and simultaneously atomize and ignite the fuel so driven out. This condition will be facilitated by the fact that in normal operations the wall at point 61 will be quite hot, and a portion of the fuel at the boundary layer near the wall will be vaporized and hence the friction between the wall and the unburned fuel will be very much reduced and so it will be swept through orifice 60 by the explosive gases and atomized. The principal advantage of this system in the figure will be its greater simplicity of construction and lower cost. The spark ignition operates ahead of the fuel injection as in all of these devices so as to insure explosion the instant that an explosive mixture is formed. A "glow plug" ignition system might be used.

With such an arrangement, an explosion at the opening 60 of the auxiliary preliminary chamber of a small size will inject the bulk of the liquid fuel into the main combustion chamber and atomize it by means of the aspirating and atomizing action of the emergent gaseous and fuel-rich mixtures. The invention is intended for use to provide an explosive injection in a system operated on an unthrottled or partially throttled explosive cycle injection spark-ignited engine which is operated on the stratified combustion principle and the invention is intended for providing in such an arrangement efficient light load operation.

One of the principal objects achieved in this invention is that the injection and atomization of fuel in such an engine can be obtained at probably ¼ to ⅒ the injection pump that would be required with normal direct injection and so-called mechanical or "solid" pressure injection which obtains by such means the high atomization as is now common practice in compression ignition and spark ignition stratified combustion engines. In such high pressure injection, the injection passages must be very small, they clog up easily, and the injection pressures run to several thousand pounds per square inch, making an expensive injection pump necessary, and one which is undesirably noisy under most conditions of operation of transport vehicles and motor cars, and which must have a sturdy drive mechanism from the engine. The injection pump power required with this proposed system will be very little.

Further, an important feature of the present design is that the entire device can be installed through the spark plug hole, slightly enlarged, if required of a presently designed automotive engine and with but slight resulting change in the compression ratio. A change in compression ratio so small as to be easily compensated for by changing the thickness of the head gasket or planing a small amount off the cylinder head casting.

In order that this system may work as proposed through a wide range of load, it will be necessary that the volume in the auxiliary preliminary chamber system be small relative to the volume of the combustion chamber of the engine cylinder at top dead center. That is, the volume of the auxiliary preliminary chamber should be not more than 10% to 30% of volume of the main combustion volume at the top most position of the piston. The exact volume of the pre-combustion chamber will be determined by trial and will depend to some extent upon the lowest percentage of full load fuel injection at which the particular engine must run smoothly.

With an engine and auxiliary preliminary chamber injection ignition arrangement as shown, the engine can be operated at light loads with the air intake unthrottled, or nearly so, so as to reduce the pumping losses now associated with a throttle controlled carburetor fueled or manifold fuel injection engines, thus giving a higher efficiency at such light loads. Further, the combustion and expansion gas mixture will be leaner at such light loads, that is, less fuel to air, which gives a better theoretical cycle efficiency and the provision of the excess air at this condition, by virtue of the lean mixture, will insure a minimum of unburned hydrocarbons in the exhaust and so a minimum of smoke or smog-forming elements will be pushed out the exhaust. It becomes possible to arrange the fuel control so as to completely shut off the fuel when the vehicle is over-running the engine (coasting) and so reduce fuel consumption and completely eliminate unburned products being emitted from the exhaust under which condition the present "Otto" cycle carburetor fed engines emit the most fog-forming products.

Further, it will probably be possible to completely vaporize and mix a fuel charge at heavy loads by virtue of the power of the explosive atomization at the openings into the cylinder so that more complete burning of the air in the cylinder will be possible than with so-called solid or mechanical injection systems alone, but if not, supplementary fuel can still be injected into the engine manifold at those rare periods when maximum possible power is required. The ability to shut off fuel on coasting and provide ready reignition upon restoring fuel injection should, in itself, bring about substantial further fuel economies over the normal operation cycle of a vehicle. At present, carburetor fed engines consume fuel even when the vehicle is coasting and the motor is being used as a partial brake.

Although basically this device is shown and is intended to be suitable for 4-cycle engines, it is perfectly fitted to be used on air-scavenged 2-cycle engines.

If now the arrangement shown in the figure is used, with the chamber volume 34 or 34′—¼ or less of the clearance volume and with the compression ratio high enough to produce ignition without the use of the spark or "glow plug" except for cold-starting, the operation should be essentially as described for the lower compression ratio engine with the ignition device operating. That is as soon as the fuel density in the pre-combustion chamber 34′ attained a sufficient value as to promote combustion a rapid increase in pressure in the pre-combustion chamber would take place. In the case of the arrangement shown in the figure the rise in pressure in the pre-combustion chamber 34′ due to combustion therein-in would force the excess fuel deposited by the nozzle 39′ in the constricted portion of the chamber 62 and on the wall 61 out through the orifice 60 in a finely atomized condition much as in the older air injection diesels, but here there would be the added advantage of the air doing the atomization being at 2,000 to 3,000° F. temperature and flaming, instead of being cooled by the expansion and so combustion would be very much promoted. In case of diesel engines with a non-turbulent combustion chamber the single orifice 60 in the figure might be replaced with two or more smaller orifices at angles with each other so as to promote dispersal and better mixing of the flaming fuel combustion gas mixture with the unburned compressed air in the main engine combustion chamber.

The particular advantages of this arrangement in comparison to the presently used so called high pressure or "solid" injection for compression ignition engines in addition to the securing of more complete and smoke free combustion would be freedom to use much lower fuel pressure injection systems, larger openings in injection nozzles, less perfect cleaning of the fuel, heavier fuel oil, and if the "glow plug" or spark plug ignition is to be continued to be used at all times, fuels with poor ignition quality or low "cetane" numbers could be used. A spark plug could probably not be built which would stand up under the temperature conditions in a diesel engine cylinder or in the relatively large pre-combustion cylinders of present day diesels using such pre-combustion chambers. The temperature conditions to which a spark or "glow plug" would be exposed in a small pre-combustion chamber, such as disclosed herein, because of well known physical laws, would be much lower and well within the capabilities of such equipment. It is also quite probable that the so called "diesel knock" would be greatly reduced, and hence the engines would run quieter and not be subjected to such destructively high instantaneous pressures as are apt to be present in solid injection engines today.

Thus, among others, the several objects in the invention, as specifically aforenoted, are achieved. Obviously, numerous changes in construction and rearrangement of parts might be resorted to without departing from the spirit of the invention as defined by the claims.

I claim:

1. In an internal combustion engine of the type having a piston, cylinder, air inlet valve and cylinder head space forming a main combustion chamber and operating with a substantially unthrottled supply of air to the inlet valve of the combustion chamber, that improvement consisting of an auxiliary preliminary chamber having a volume less than one-third the volume of the engine combustion chamber, said volume being measured at the clearance space at top dead center position of the piston in the cylinder head space, an orifice formed in said auxiliary preliminary chamber allowing communication of said auxiliary preliminary chamber with said main combustion chamber and allowing air in said main chamber to pass into said auxiliary preliminary chamber during the upstroke of the piston and provide turbulent air flow within said auxiliary preliminary chamber, said auxiliary preliminary chamber being elongated and substantially circular in cross section with a reduced diameter portion adjacent said orifice whereby fuel is sprayed through said orifice in the form of an atomized jet prior to ignition in the combustion chamber, a fuel igniting device disposed in said auxiliary preliminary chamber, fuel injection means near said fuel igniting device for injecting fuel under pressure into said auxiliary preliminary chamber against a surface of said auxiliary preliminary chamber intermediate said orifice and said fuel igniting device in substantially the same plane as said means for injecting fuel and on one side of the longitudinal axis of the auxiliary preliminary chamber with the means for injecting fuel on the remaining side whereby portions of fuel are atomized.

2. An internal combustion engine in accordance with claim 1 in which said surface of said auxiliary preliminary chamber against which the fuel is injected is angularly disposed and faced toward said fuel igniting device.

3. An internal combustion engine in accordance with claim 1 in which the fuel igniting device is substantially disposed on the longitudinal axis of the auxiliary preliminary chamber whereby the compressed air entering said auxiliary preliminary chamber through said orifice will cause a turbulent motion of the air in said auxiliary preliminary chamber with the fuel injected into said auxiliary preliminary chamber and hence will be mixed with the fuel injected into said auxiliary preliminary chamber by said means for injecting fuel prior to ignition by said fuel igniting device.

4. An internal combustion engine in accordance with claim 2 in which the fuel injected by the means for injecting fuel strikes said hot angularly disposed surface prior to ignition by said fuel igniting device, said angularly disposed surface being such as to deflect the fuel toward said orifice of said auxiliary preliminary chamber.

References Cited in the file of this patent

UNITED STATES PATENTS

| | | |
|---|---|---|
| 2,075,911 | Roth | Apr. 6, 1937 |
| 2,585,100 | Falcon | Feb. 12, 1952 |
| 2,674,983 | Kraus | Apr. 13, 1954 |
| 2,690,741 | Broderson | Oct. 5, 1954 |
| 2,758,576 | Schlamann | Aug. 14, 1956 |
| 2,893,360 | Muller | July 7, 1959 |
| 2,914,043 | Nallinger | Nov. 24, 1959 |

FOREIGN PATENTS

| | | |
|---|---|---|
| 805,078 | Great Britain | Nov. 26, 1958 |

OTHER REFERENCES

High Speed Diesel Engines, by P. M. Heldt, 6th edition; published by P. M. Heldt, Nyack, N.Y., 1950; TJ 795 H4. Pages 219, 237.

Internal Combustion Engines, by Obert, 2nd edition; published by International Textbook Col., Scranton, Pa., 1950; TJ 78502. Pages 462 to 467 inclusive.

Internal Combustion Engines, by Lichty, 6th edition, published by McGraw-Hill, New York, 1951, TJ 755 L5.